United States Patent
Logé et al.

(10) Patent No.: US 9,709,378 B2
(45) Date of Patent: Jul. 18, 2017

(54) RESOLVER

(71) Applicant: LTN SERVOTECHNIK GMBH, Otterfing (DE)

(72) Inventors: Hans Logé, Neukeferloh (DE); Manfred Hick, Bruckmühl (DE); Ludwig Angerpointner, München (DE)

(73) Assignee: LTN SERVOTECHNIK GMBH, Otterfing (DE)

( * ) Notice: Subject to any disclaimer, the term of this patent is extended or adjusted under 35 U.S.C. 154(b) by 349 days.

(21) Appl. No.: 14/602,022

(22) Filed: Jan. 21, 2015

(65) Prior Publication Data

US 2015/0241199 A1 Aug. 27, 2015

(30) Foreign Application Priority Data

Feb. 27, 2014 (EP) .................................... 14000709

(51) Int. Cl.
*H01F 38/18* (2006.01)
*G01B 7/30* (2006.01)
*H02K 24/00* (2006.01)
*G01D 5/20* (2006.01)
*G08C 19/46* (2006.01)

(52) U.S. Cl.
CPC .............. *G01B 7/30* (2013.01); *G01D 5/2086* (2013.01); *H01F 38/18* (2013.01); *H02K 24/00* (2013.01); *G08C 19/46* (2013.01)

(58) Field of Classification Search
CPC ........ H01F 38/18; G01B 7/30; G01D 5/2086; H02K 24/00; G08C 19/46; G08C 19/48

USPC ...................... 324/207.25; 336/115, 118, 122
See application file for complete search history.

(56) References Cited

U.S. PATENT DOCUMENTS

| | | | |
|---|---|---|---|
| 4,928,046 A | 5/1990 | Karasawa | |
| 5,032,750 A | 7/1991 | Hayashi | |
| 6,876,120 B2 | 4/2005 | Miya et al. | |
| 7,053,791 B2 * | 5/2006 | Kazmierczak | G08C 17/04 336/115 |
| 7,235,966 B2 * | 6/2007 | Miya | G01D 5/2086 318/661 |
| 2012/0062217 A1 | 3/2012 | Logé et al. | |

FOREIGN PATENT DOCUMENTS

| | | |
|---|---|---|
| CN | 102395862 | 3/2012 |
| EP | 1 408 309 | 4/2004 |
| JP | 59-154319 | 9/1984 |

\* cited by examiner

*Primary Examiner* — Burton Mullins
(74) *Attorney, Agent, or Firm* — Andrews Kurth Kenyon LLP

(57) ABSTRACT

A resolver includes a first assembly having transmitter windings and a first winding of a first transformer. The resolver also includes a second assembly having receiver windings, a first winding of a second transformer, and a first winding of a third transformer. A third assembly of the resolver includes a second winding of the first transformer, a second winding of the second transformer, and a second winding of the third transformer. The three assemblies are rotatable relative to each other about an axis. The windings of the first transformer, the windings of the second transformer, the windings of the third transformer, the transmitter windings, and the receiver windings are arranged opposite each other in each case, separated by a radial gap.

15 Claims, 2 Drawing Sheets

RESOLVER

CROSS-REFERENCE TO RELATED APPLICATIONS

The present application claims priority to application Ser. No. 14/000,709.7, filed in the European Patent Office on Feb. 27, 2014, which is expressly incorporated herein in its entirety by reference thereto.

FIELD OF THE INVENTION

The present invention relates to a resolver.

BACKGROUND INFORMATION

In electrical engineering, a resolver is an electromagnetic measuring transformer for converting the angular position of a rotor into an electrical quantity or into electrical signals. These signals are ultimately used to determine the relative angular position or the relative angular velocity between two assemblies which can rotate relative to each other, e.g., two machine parts rotatable in relation to each other. Resolvers also include measuring transformers, which are referred to as synchros or rotary resolvers.

Conventional resolvers are used for measuring an angular position between a stationary machine component (stator) and a machine component (rotor), which rotates relative to the stationary part.

SUMMARY

Example embodiments of the present invention provide a robust resolver, which is able to be manufactured in a cost-effective manner and which makes it possible to measure an angular position between two machine components that rotate at different rotational frequencies.

According to an example embodiment of the present invention, a resolver includes a first assembly, which has transmitter windings and a first winding of a first transformer. In addition, the resolver includes a second assembly, which has receiver windings and a first winding of a second transformer as well as a first winding of a third transformer. Moreover, the resolver includes a third assembly, which has a second winding of the first transformer and a second winding of the second transformer, as well as a second winding of the third transformer. The three assemblies are rotatably arranged relative to each other about an axis. The windings of the first transformer, the windings of the second transformer, the windings of the third transformer, the transmitter windings, and the receiver windings are arranged opposite each other, separated by a radial gap in each case.

The third assembly may include an electric coupling for connecting the resolver to a voltage supply and/or sequential electronics. This configuration in particular offers the possibility of using the third assembly as a stator, e.g., as a non-rotating part. The first assembly is rotatable relative to the third assembly, the first assembly is rotatable relative to the second assembly, and the second assembly is rotatable relative to the third assembly.

The resolver is configured such that a voltage required for the supply of the transmitter windings is able to be transmitted from the third assembly via the first transformer to the first assembly, especially to the transmitter windings.

The resolver may be configured such that voltage signals, especially voltage signals coming from the receiver windings, are transmittable from the second assembly via the second and/or third transformer to the third assembly, especially to the electric coupling.

In particular with regard to a space-saving configuration, the first transformer is located at a different distance from the axis than the second or the third transformer.

Moreover, the second transformer and the third transformer may be situated in an overlapping fashion with regard to the distance from the axis. In other words, the second transformer and the third transformer may be placed such that a straight line, which is oriented parallel with the axis, extends through both transformers. In a special case, the second transformer and the third transformer may be arranged such that their radial gap (i.e., the gap between the windings of the particular transformer) has the same distance from the axis in each case. The second transformer and the third transformer, in particular, may be provided next to each other in the axial direction.

The transformers may be disposed in at least two concentrically placed housings, and the inner diameters of the housings, for example, may have different diameters or distances from the axis, so that in this case the transformers may be situated in a concentric manner at a radial offset from each other.

The second winding of the second transformer and the second winding of the third transformer may have the same diameter. As an alternative or in addition, the first winding of the second transformer and the first winding of the third transformer may have the same diameter. The windings of the transformers are normally arranged in the form of ring coils about the axis, so that the particular diameters are oriented perpendicularly (and symmetrically or concentrically) to the axis, the axis being intersected by the diameter lines.

The windings of the transformers are frequently disposed in winding housings. The winding housing of the second winding of the second transformer and the winding housing of the second winding of the third transformer therefore may have the same diameter, the diameter of the winding housing denoting the relevant diameters for the mounting to another housing. As an alternative or in addition, the winding housing of the first winding of the second transformer and the winding housing of the first winding of the third transformer may have the same diameters, especially the same inner diameters.

At least one bearing, e.g., a roller bearing, may be arranged between the first assembly and the second assembly and between the second assembly and the third assembly.

The first assembly may be configured such that it is able to be fixed in place on a shaft in a torsionally fixed manner.

Especially when the first assembly can be fixed in place on a shaft in a torsionally fixed manner, the second assembly may be configured such that the first winding of the second transformer and/or the first winding of the third transformer are/is situated at a greater distance from the axis than the receiver windings.

Furthermore, the third assembly may be configured such that the second winding of the second transformer and/or the second winding of the third transformer are/is situated at a greater distance from the axis than the second winding of the first transformer.

The second assembly may be configured such that it is able to be fixed in place on a shaft in a torsionally fixed manner.

Especially when the second assembly can be fixed in place on a shaft in a torsionally fixed manner, the second assembly may be configured so that the first winding of the second transformer and/or the first winding of the third transformer are/is situated at a smaller distance from the axis than the transmitter windings.

Furthermore, the third assembly may be configured such that the second winding of the second transformer and/or the second winding of the third transformer are/is situated at a smaller distance from the axis than the second winding of the first transformer.

Further features and aspects of example embodiments of the present invention are described in more detail below with reference to the appended Figures.

DETAILED DESCRIPTION

Figure 1:
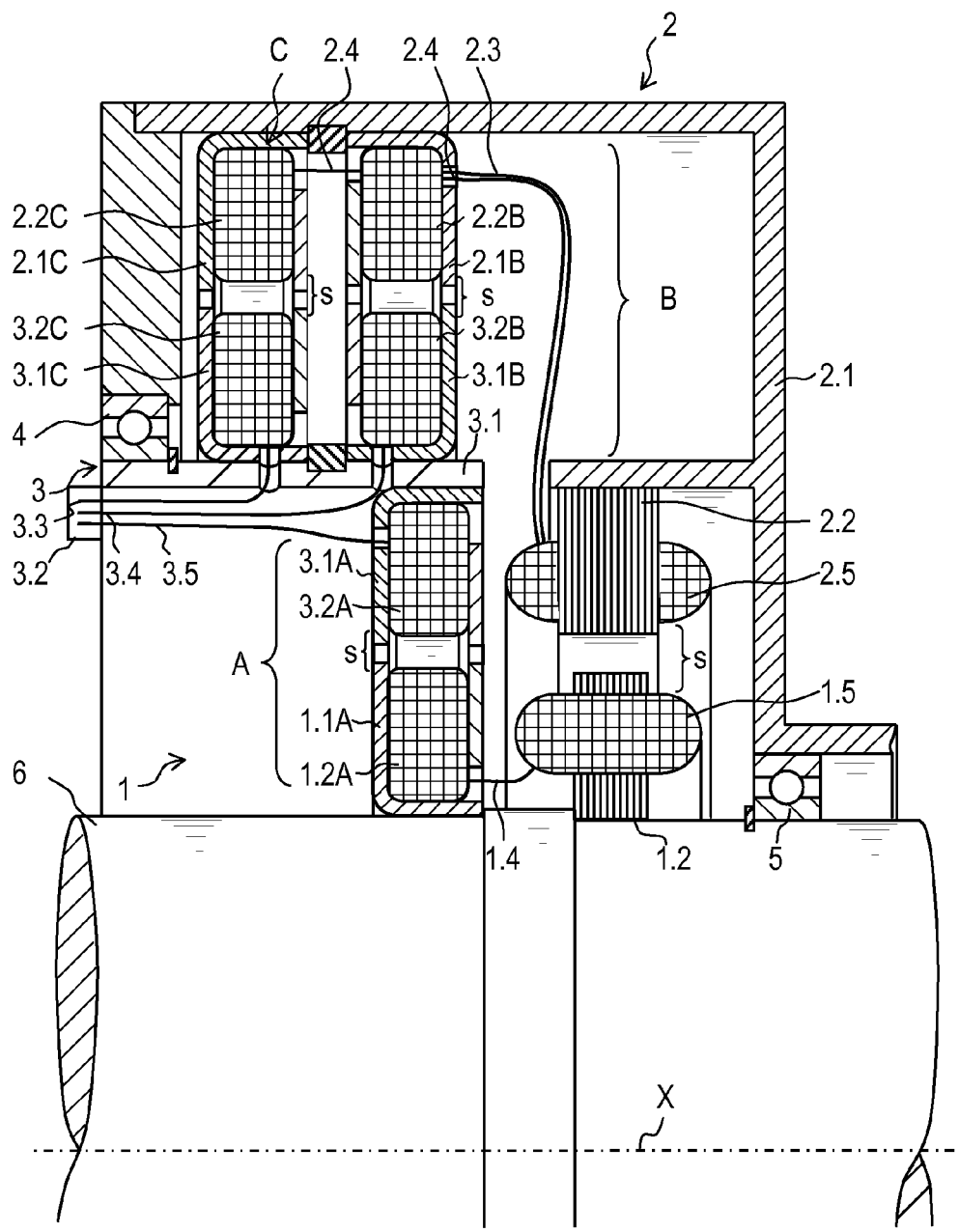
FIG. 1 is a longitudinal cross-sectional view of a resolver, according an exemplary embodiment of the present invention.

According to an example embodiment of the present invention, as illustrated in FIG. 1, a resolver includes a first assembly 1, which has transmitter windings 1.5 for transmitting resolver signals, and an associated core stack 1.2. Core stack 1.2 has teeth and grooves situated between the teeth, and transmitter windings 1.5 are situated inside the grooves.

Furthermore, a winding 1.2A in, e.g., a two-part winding housing 1.1A, is associated with first assembly 1, winding 1.2A and winding housing 1.1A being part of a first transformer A. Core stack 1.2 and winding housing 1.1A of first transformer A are fixed in place on a shaft 6 in a torsionally fixed manner. In addition, first assembly 1 includes a cable 1.4, which is used as an electrical connection between windings 1.2A of first transformer A and transmitter windings 1.5.

Arranged opposite transmitter windings 1.5, separated by a radial gap s, are receiver windings 2.5, which are assigned to a second assembly 2. Receiver windings 2.5 are fixed in place on a core stack 2.2. In the present exemplary embodiment, two receiver windings 2.5, offset by 90°, are provided. In addition, second assembly 2 has a housing 2.1. Arranged within this housing 2.1 and connected thereto in a torsionally fixed manner is a winding 2.2B, which in turn is arranged inside a winding housing 2.1B, and a further winding 2.2C, which is arranged in a further winding housing 2.1C. Windings 2.2B and associated winding housing 2.1B are part of a second transformer B, while winding 2.2C with winding housing 2.1C is part of a third transformer C. Via cables 2.3, 2.4, windings 2.2B, 2.2C of second and third transformer B, C, respectively, are electrically connected to receiver windings 2.5. As an alternative, instead of cables 1.4, 2.3, 2.4, for example, the wires of windings 1.2A, 2.2B, 2.2C may be directly connected to transmitter windings 1.5 or receiver windings 2.5.

Second assembly 2 is rotatably mounted with respect to shaft 6, and thus with respect to first assembly 1 as well, with the aid of a bearing 5, so that first assembly 1 and second assembly 2 are therefore situated around an axis X in a manner that allows them to rotate relative to each other.

Furthermore, the resolver has a third assembly 3, which includes a tube-like housing 3.1. Mounted on the inside of housing 3.1 is a winding 3.2A in a winding housing 3.1A, winding 3.2A and winding housing 3.1A being associated with first transformer A. Accordingly, windings 1.2A, 3.2A of first and third assembly 1, 3, respectively, are situated opposite each other separated by a radial gap s. In addition, third assembly 3 includes windings 3.2B, 3.2C and associated winding housings 3.1B, 3.1C of second and third transformer B, C. Accessible from the outside, third assembly 3 includes an electric coupling 3.2, the terminals being electrically connected to cables 3.3, 3.4, 3.5. Cables 3.3, 3.4, 3.5 may have multiple cores, e.g., two cores, so that electrical coupling 3.2 may therefore have more connecting pins or connector sockets than illustrated in FIG. 1. The necessary excitation energy, in the form of an alternating voltage, is able to be fed into the resolver via electrical coupling 3.2, and corresponding voltage signals can be output as measured quantities.

The resolver thus includes three transformers A, B, C. First transformer A is arranged at a smaller distance from axis X than second transformer B and also at a smaller distance from axis X than third transformer C. In contrast, second transformer B and third transformer C are arranged at the same distance from axis A in each case, i.e., are arranged axially next to each other.

As illustrated in FIG. 1, first and second transformers A, B are arranged in two housings 2.1, 3.1, which are situated concentrically in relation to each other, the inner diameters of housings 2.1, 3.1 differing, so that it could also be said that the placement of transformers A, B is radially offset. The same also holds true for first and third transformers A, C.

Second assembly 2 is rotatably mounted with respect to third assembly 3, using a further bearing 4. Accordingly, second assembly 2 and third assembly 3 are therefore rotatable relative to each other about an axis X. In conjunction with the relative rotatability of first assembly 1 with respect to second assembly 2, it is therefore the case that all assemblies 1, 2, 3 are situated in a manner that allows them to rotate relative to each other, so that the resolver may be operated such that first assembly 1 rotates at a first rotational frequency n1, second assembly 2 rotates at a second rotational frequency n2, and third assembly 3 rotates at a third rotational frequency n3, first rotational frequency n1 corresponding to the rotational velocity of shaft 6.

The relative angular position between first assembly 1 and second assembly 2 is able to be determined with the aid of a corresponding resolver. Shaft 6 may be connected to a drive, and housing 2.1 of first assembly 2 may furthermore be connected to another separate drive.

The resolver may be operated such that third assembly 3 acts as a stator, and second assembly 2 rotates relative to third assembly 3 and first assembly 1, so that the following applies:

0=n3<n1 and 0=n3<n2 and, in general, n1≠n2.

Accordingly, first assembly 1 rotates at a variable relative rotational frequency n1-n2 in relation to second assembly 2, and third assembly 3 is stationary.

To ascertain the relative angular position or the relative rotational frequency between first assembly 1 and second assembly 2, a sinusoidal alternating current (excitation energy) is applied to winding 3.2A of third assembly 3 via cable 3.5. This has the result that an alternating voltage having a predefined transformation ratio is induced in winding 1.2A of first assembly 1. This alternating voltage is also applied to transmitter windings 1.5 of first assembly 1, via cable 1.4. The voltage required for the supply of transmitter windings 1.5 is therefore transmitted via first transformer A from third assembly 3 to first assembly 1.

As a result, corresponding voltage signals are induced in receiver windings 2.5 of second assembly 2, which enclose transmitter windings 1.5 of first assembly 1. When using two receiver windings 2.5 of second assembly 2 that are offset by 90°, two voltage signals that are phase-offset by 90° are able to be picked off, the voltage signals being a function of the relative angular position between first assembly 1 and second assembly 2.

The two phase-offset voltage signals are transmitted to windings 2.2B, 2.2C with the aid of cables 2.3, 2.4, windings 2.2B, 2.2C being assigned to second assembly 2, just like receiver windings 2.5, and rotating at rotational frequency n2 in each case. Each winding 2.2B, 2.2C is therefore acted upon by one of the two phase-offset voltage signals. Accordingly, the voltage signals are induced in windings 3.2B, 3.2C of third assembly 3 at a predefined transformation ratio. These voltage signals are ultimately supplied to electric coupling 3.2 via cables 3.3, 3.4. From there, they may be forwarded to an evaluation electronics, using a cable.

Figure 2:
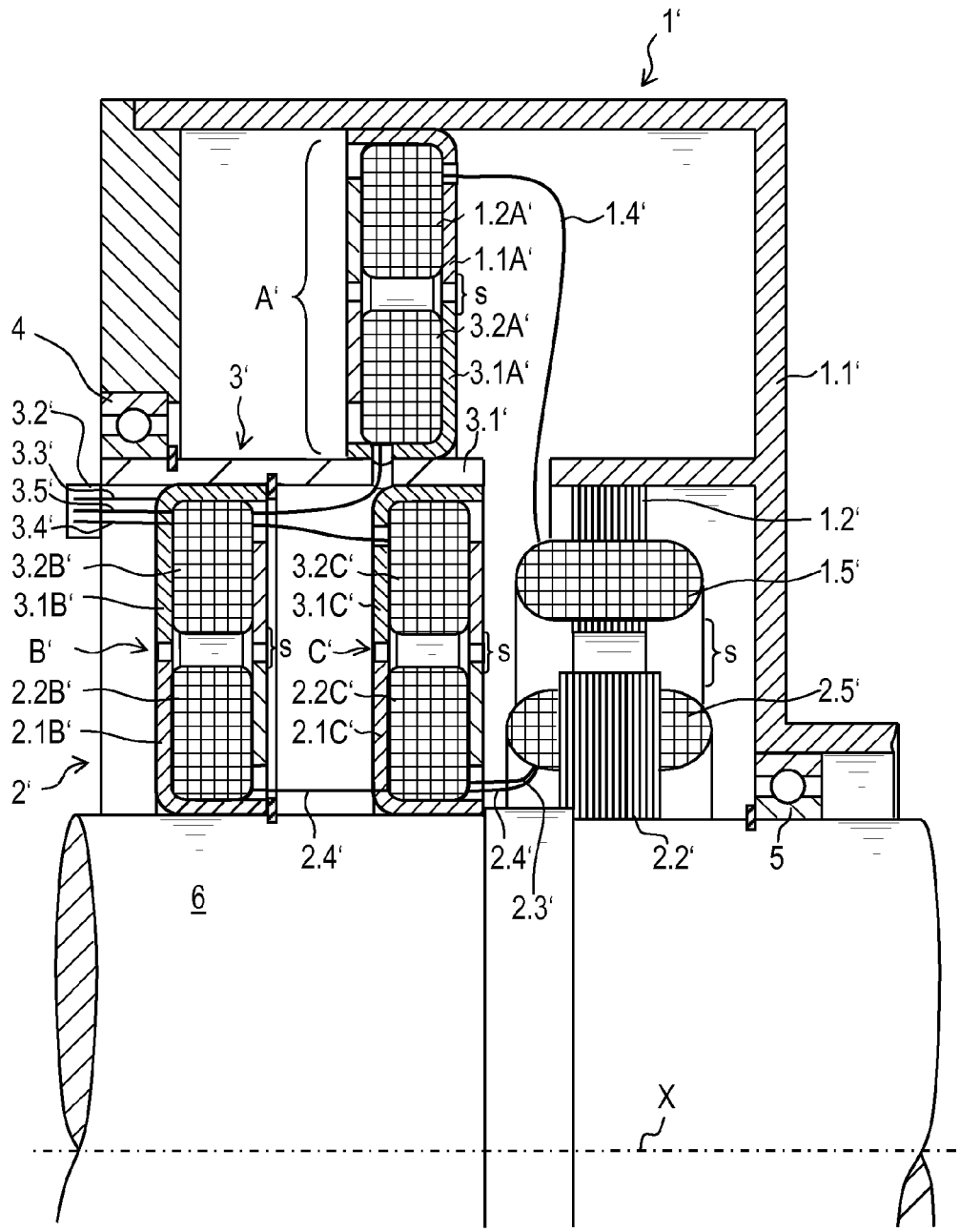
FIG. 2 is a longitudinal cross-sectional view of a resolver, according to an exemplary embodiment of the present invention.

FIG. 2 illustrates an exemplary embodiment of the present invention, in which a resolver includes a first assembly 1', which includes transmitter windings 1.5', situated on a core stack 1.2', for the transmission of resolver signals. In addition, a first winding 1.2A' is assigned to first assembly 1' inside a winding housing 1.1A'. Winding 1.2A' and winding housing 1.1A' are part of a first transformer A'. Core stack 1.2' and winding housing 1.1A' of first transformer A' are fixed in place on a housing 1.1' in a torsionally fixed manner. In addition, first assembly 1' includes a cable 1.4', which is used as an electrical connection between windings 1.2A' of first transformer A' and transmitter windings 1.5'.

Moreover, the resolver has receiver windings 2.5', which are situated across from transmitter windings 1.5' with a radial gap s. Receiver windings 2.5' are fixed in place on a core stack 2.2' and assigned to a second assembly 2'. In the this exemplary embodiment, as well, two receiver windings 2.5', which are offset by 90°, are provided. Core stack 2.2' is fixed in place on a shaft 6 in a torsionally fixed manner, so that shaft 6 carries receiver windings 2.5' along in the rotation. Likewise connected to shaft 6 in a torsionally fixed manner is a winding 2.2B', which in turn is disposed inside a winding housing 2.1B'. In addition, a further winding 2.2C', which is situated in another winding housing 2.1C', is fixed in place on a shaft 6 in a torsionally fixed manner. Windings 2.2B' and associated winding housing 2.1B' are part of a second transformer B', while winding 2.2C' with winding housing 2.1C' is part of a third transformer C'. Via cables 2.3', 2.4', windings 2.2B', 2.2C' of second and third transformers B', C', respectively, are electrically connected to receiver windings 2.5'.

As illustrated in FIG. 2, first and second transformers A', B' are provided in two housings 1.1', 3.1', which are disposed in a concentric manner with respect to each other, the inner diameter of housings 1.1', 3.1' differing, so that it could also be said that the placement of transformers A', B' is radially offset. The same also holds true for first and third transformers A', C'.

Second assembly 2', in particular shaft 6, is rotatably mounted with respect to first assembly 1' with the aid of a bearing 5, so that first assembly 1' and second assembly 2' are therefore provided around an axis X in a manner that allows them to rotate relative to each other.

Furthermore, the resolver has a third assembly 3', which includes a tube-like housing 3.1'. Mounted on the outside of housing 3.1' is a winding 3.2A' inside a winding housing 3.1A', winding 3.2A' and winding housing 3.1' being associated with first transformer A'. Accordingly, windings 1.2A', 3.2A' of first and third assembly 1', 3', respectively, are situated opposite each other, separated by a radial gap s. In addition, third assembly 3' includes windings 3.2B', 3.2C' as well as associated winding housings 3.1B', 3.1C' of second and third transformer B', C', which are fixed in place on the inside of housing 3.1'. In addition, third assembly 3' has an electric coupling 3.2', which is accessible from the outside and whose terminals are electrically connected to cables 3.3', 3.4', 3.5'. In this second exemplary embodiment, as well, cables 3.3', 3.4', 3.5' may have multiple cores, e.g., two cores, so that electrical coupling 3.2' could have more connecting pins or connector sockets than illustrated in FIG. 2. The necessary excitation energy in the form of an alternating voltage is able to be fed into the resolver via electrical coupling 3.2', and corresponding voltage signals can be output as measured quantities.

Therefore, the resolver includes three transformers A', B', C'. First transformer A' is located at a greater distance from axis X than second transformer B' and is furthermore located at a greater distance from axis X than third transformer C'. In contrast, second transformer B' and third transformer C' are located at the same distance from axis X, e.g., they are placed next to each other in the axial direction.

In this exemplary embodiment, first assembly 1' is rotatably mounted in relation to third assembly 3' with the aid of a further bearing 4. Accordingly, first assembly 1' and third assembly 3' are therefore rotatable relative to each other about an axis X. In connection with the relative rotatability of first assembly 1' in relation to second assembly 2', it is therefore the case that all assemblies 1', 2', 3' are situated in a manner that allows them to rotate relative to each other, so that the resolver can be operated such that first assembly 1' rotates at a first rotational frequency n1', second assembly 2' rotates at a second rotational frequency n2', and third assembly 3' rotates at a third rotational frequency n3', first rotational frequency n1' corresponding to the rotational frequency of shaft 6.

The relative angular position between first assembly 1' and second assembly 2' is able to be determined with the aid of a corresponding resolver. Shaft 6 may be connected to a drive, and housing 1.1' of first assembly 1' may furthermore be connected to another separate drive.

The resolver may be operated such that third assembly 3' acts as a stator, and second assembly 2' rotates relative to third assembly 3' and first assembly 1', so that the following applies:

0=n3'<n1' and 0=n3'<n2' and, in general, n1'≠n2'.

Accordingly, first assembly 1' rotates at a variable relative rotational frequency n1'-n2' in relation to second assembly 2', and third assembly 3' is stationary.

To ascertain the relative angular position or the relative rotational velocity between first assembly 1' and second assembly 2', a sinusoidal alternating current (excitation energy) is applied to winding 3.2A' of third assembly 3' via cable 3.5'. As a result, an alternating voltage having a predefined transformation ratio is induced in winding 1.2A' of first assembly 1'. This alternating voltage is also applied to transmitter windings 1.5' of first assembly 1' via cable 1.4'. The voltage required for the supply of transmitter windings 1.5' is therefore transmitted via first transformer A' from third assembly 3' to first assembly 1'. As a result, corresponding output voltages are induced in receiver windings 2.5' of second assembly 2', which enclose transmitter windings 1.5' of first assembly 1'. When using two receiver windings 2.5' of second assembly 2' that are offset by 90°, two voltage signals that are phase-offset by 90° are able to be picked off, which are a function of the relative angular position between first assembly 1' and second assembly 2'.

The two phase-offset voltage signals are transmitted to windings 2.2B', 2.2C' with the aid of cables 2.3', 2.4', windings 2.2B', 2.2'C being assigned to second assembly 2', just like receiver windings 2.5', and rotating at rotational frequency n2' in each case. Each winding 2.2B', 2.2C' is therefore acted upon by one of the two phase-offset voltage signals. Accordingly, the voltage signals are induced in windings 3.2B', 3.2C' of third assembly 3' at a predefined transformation ratio. These voltage signals are ultimately supplied to electric coupling 3.2' via cables 3.3', 3.4'. From there, they may be forwarded to an evaluation electronics, using a cable.

The resolver described herein may be arranged as a brushless or slipringless resolver.

Example embodiments of the present invention thus provide a resolver, which is advantageous, for example, if two components are rotating at different rotational frequencies, e.g., at n1, n1' and n2, n2', each of these rotational frequencies differing from 0. This is the case because the resolver described herein makes it possible to reliably ascertain the relative positions and/or relative frequencies of the rotating components with regard to each other, even at high rotational frequencies, and the resolver may be used for the commutation of an electric drive within a rotating system.

What is claimed is:

1. A resolver, comprising:
   a first assembly including transmitter windings and a first winding of a first transformer;
   a second assembly including receiver windings, a first winding of a second transformer, and a first winding of a third transformer; and
   a third assembly including a second winding of the first transformer, a second winding of the second transformer, and a second winding of the third transformer;
   wherein the three assemblies are rotatable relative to each other around an axis; and
   wherein the windings of the first transformer, the windings of the second transformer, the windings of the third transformer, the transmitter windings, and the receiver windings are arranged opposite each other in each case, separated by a radial gap.

2. The resolver according to claim 1, wherein the third assembly includes an electric coupling adapted to connect the resolver to a voltage supply and/or sequential electronics.

3. The resolver according to claim 1, wherein the resolver is configured such that a voltage required to supply the transmitter windings is transmittable from the third assembly via the first transformer to the first assembly.

4. The resolver according to claim 1, wherein the resolver is configured such that voltage signals are transmittable from the second assembly via the second and/or third transformer to the third assembly in each case.

5. The resolver according to claim 1, wherein the first transformer is located at a different distance from the axis than the second transformer or the third transformer.

6. The resolver according to claim 1, wherein the second transformer and the third transformer are arranged in an overlapping manner with regard to distance from the axis.

7. The resolver according to claim 1, wherein the transformers are arranged in at least two housings, which are situated concentrically with respect to each other.

8. The resolver according to claim 1, wherein: a diameter of the second winding of the second transformer and a diameter of the second winding of the third transformer are the same; and/or a diameter of the first winding of the second transformer and a diameter of the first winding are the same.

9. The resolver according to claim 1, wherein at least one bearing is provided between the first assembly and the second assembly and between the second assembly and the third assembly.

10. The resolver according to claim 1, wherein the first assembly is adapted to be fixed in place on a shaft in a torsionally fixed manner.

11. The resolver according to claim 10, wherein the first winding of the second transformer or the first winding of the third transformer is located at a greater distance from the axis than the receiver windings.

12. The resolver according to claim 10, wherein the second winding of the second transformer or the second winding of the third transformer is located at a greater distance from the axis than the second winding of the first transformer.

13. The resolver according to claim 1, wherein the second assembly is adapted to be fixed in place on a shaft in a torsionally fixed manner.

14. The resolver according to claim 13, wherein the first winding of the second transformer or the first winding of the third transformer is located at a smaller distance from the axis than the transmitter windings.

15. The resolver according to claim 13, wherein the second winding of the second transformer or the second winding of the third transformer is located at a smaller distance from the axis than the second winding of the first transformer.

* * * * *